(12) United States Patent
Peterson et al.

(10) Patent No.: US 9,288,201 B2
(45) Date of Patent: *Mar. 15, 2016

(54) DISCONNECTED CREDENTIAL VALIDATION USING PRE-FETCHED SERVICE TICKETS

(71) Applicant: Dell Software Inc., Aliso Viejo, CA (US)

(72) Inventors: Matthew T. Peterson, Lindon, UT (US); Jeff Marsden Webb, Lehi, UT (US)

(73) Assignee: Dell Software Inc., Aliso Viejo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/076,913

(22) Filed: Nov. 11, 2013

(65) Prior Publication Data

US 2014/0196132 A1 Jul. 10, 2014

Related U.S. Application Data

(63) Continuation of application No. 13/333,650, filed on Dec. 21, 2011, now Pat. No. 8,584,218, which is a continuation of application No. 11/352,693, filed on Feb. 13, 2006, now Pat. No. 8,087,075.

(51) Int. Cl.
 *H04L 29/06* (2006.01)
 *H04L 9/32* (2006.01)

(52) U.S. Cl.
 CPC .......... *H04L 63/0807* (2013.01); *H04L 9/3213* (2013.01)

(58) Field of Classification Search
 None
 See application file for complete search history.

(56) References Cited

U.S. PATENT DOCUMENTS 4,109,237 A 8/1978 Hill
4,370,707 A 1/1983 Phillips et al.

(Continued)

FOREIGN PATENT DOCUMENTS

| EP | 05728119.1 | 3/2005 |
| EP | 1 932 279 A2 | 6/2008 |
| WO | WO 2006/016900 | 2/2006 |
| WO | WO 2007/044613 A2 | 4/2007 |

OTHER PUBLICATIONS

Hemmes, Jeffrey; Thain, Douglas. Cacheable Decentralized Groups for Grid Resource Access Control. 7th IEEE/ACM International Conference on Grid Computing. Pub. Date: 2006. Relevant pp. 192-199. http://ieeexplore.ieee.org/stamp/stamp.jsp?tp=&arnumber=4100472.*

(Continued)

*Primary Examiner* — Jeremiah Avery
*Assistant Examiner* — Cordelia Zecher
(74) *Attorney, Agent, or Firm* — Knobbe Martens Olson & Bear, LLP

(57) ABSTRACT

One or more user service tickets are obtained (i.e. prefetched) from an authentication server and stored in a ticket cache. The user service tickets facilitate a login device communicating with one or more users or group members associated with the login device. Login credentials for the users or group members may be subsequently authenticated against the user service tickets within the ticket cache thereby eliminating the need for immediate access to the authentication server or a previous login session by the users or group members. The user service tickets within the ticket cache may be refreshed as needed. In one embodiment, the user service tickets are refreshed daily and also in response to login attempts if the authentication service is readily accessible.

19 Claims, 6 Drawing Sheets

(56) References Cited

U.S. PATENT DOCUMENTS

| | | |
|---|---|---|
| 4,694,397 A | 9/1987 | Grant |
| 5,222,018 A | 6/1993 | Sharpe et al. |
| 5,267,865 A | 12/1993 | Lee et al. |
| 5,302,132 A | 4/1994 | Corder |
| 5,310,349 A | 5/1994 | Daniels et al. |
| 5,313,465 A | 5/1994 | Perlman et al. |
| 5,333,302 A | 7/1994 | Hensley et al. |
| 5,339,435 A | 8/1994 | Lubkin et al. |
| 5,367,698 A | 11/1994 | Webber et al. |
| 5,371,852 A | 12/1994 | Attanasio et al. |
| 5,387,104 A | 2/1995 | Corder |
| 5,410,703 A | 4/1995 | Nilsson et al. |
| 5,423,032 A | 6/1995 | Byrd et al. |
| 5,437,027 A | 7/1995 | Bannon et al. |
| 5,437,555 A | 8/1995 | Ziv-el |
| 5,440,719 A | 8/1995 | Hanes et al. |
| 5,441,415 A | 8/1995 | Lee et al. |
| 5,497,486 A | 3/1996 | Stolfo et al. |
| 5,497,492 A | 3/1996 | Zbikowski et al. |
| 5,499,379 A | 3/1996 | Tanaka et al. |
| 5,530,829 A | 6/1996 | Beardsley et al. |
| 5,550,968 A | 8/1996 | Miller et al. |
| 5,550,976 A | 8/1996 | Henderson et al. |
| 5,553,291 A | 9/1996 | Tanaka et al. |
| 5,586,304 A | 12/1996 | Stupek, Jr. et al. |
| 5,590,360 A | 12/1996 | Edwards |
| 5,600,833 A | 2/1997 | Senn et al. |
| 5,608,874 A | 3/1997 | Ogawa et al. |
| 5,608,903 A | 3/1997 | Prasad et al. |
| 5,613,090 A | 3/1997 | Willems |
| 5,623,601 A | 4/1997 | Vu |
| 5,630,069 A | 5/1997 | Flores et al. |
| 5,630,131 A | 5/1997 | Palevich et al. |
| 5,659,735 A | 8/1997 | Parrish et al. |
| 5,659,736 A | 8/1997 | Hasegawa et al. |
| 5,666,502 A | 9/1997 | Capps et al. |
| 5,671,428 A | 9/1997 | Muranaga et al. |
| 5,673,386 A | 9/1997 | Batra |
| 5,673,387 A | 9/1997 | Chen et al. |
| 5,675,782 A | 10/1997 | Montague et al. |
| 5,677,997 A | 10/1997 | Talatik |
| 5,680,586 A | 10/1997 | Elkins et al. |
| 5,684,950 A | 11/1997 | Dare et al. |
| 5,692,132 A | 11/1997 | Hogan |
| 5,692,902 A | 12/1997 | Aeby |
| 5,694,540 A | 12/1997 | Humelsine et al. |
| 5,706,502 A | 1/1998 | Foley et al. |
| 5,708,812 A | 1/1998 | Van Dyke et al. |
| 5,708,828 A | 1/1998 | Coleman |
| 5,710,884 A | 1/1998 | Dedrick |
| 5,711,671 A | 1/1998 | Geeslin et al. |
| 5,724,521 A | 3/1998 | Dedrick |
| 5,727,145 A | 3/1998 | Nessett et al. |
| 5,727,951 A | 3/1998 | Ho et al. |
| 5,740,427 A | 4/1998 | Stoller et al. |
| 5,743,746 A | 4/1998 | Ho et al. |
| 5,745,113 A | 4/1998 | Jordan et al. |
| 5,745,902 A | 4/1998 | Miller et al. |
| 5,752,042 A | 5/1998 | Cole et al. |
| 5,754,173 A | 5/1998 | Hiura et al. |
| 5,754,938 A | 5/1998 | Herz et al. |
| 5,758,062 A | 5/1998 | Mcmahon et al. |
| 5,758,074 A | 5/1998 | Marlin et al. |
| 5,758,344 A | 5/1998 | Prasad et al. |
| 5,764,897 A | 6/1998 | Khalidi |
| 5,765,140 A | 6/1998 | Knudson et al. |
| 5,768,519 A | 6/1998 | Swift et al. |
| 5,774,551 A | 6/1998 | Wu et al. |
| 5,778,169 A | 7/1998 | Reinhardt |
| 5,784,553 A | 7/1998 | Kolawa et al. |
| 5,784,643 A | 7/1998 | Shields |
| 5,790,801 A | 8/1998 | Funato |
| 5,796,393 A | 8/1998 | Macnaughton et al. |
| 5,806,075 A | 9/1998 | Jain et al. |
| 5,812,669 A | 9/1998 | Jenkins et al. |
| 5,812,865 A | 9/1998 | Theimer et al. |
| 5,815,657 A | 9/1998 | Williams et al. |
| 5,819,265 A | 10/1998 | Ravin et al. |
| 5,819,281 A | 10/1998 | Cummins |
| 5,819,295 A | 10/1998 | Nakagawa et al. |
| 5,822,518 A | 10/1998 | Ooki et al. |
| 5,835,087 A | 11/1998 | Herz et al. |
| 5,835,911 A | 11/1998 | Nakagawa et al. |
| 5,838,918 A | 11/1998 | Prager et al. |
| 5,844,508 A | 12/1998 | Murashita et al. |
| 5,848,396 A | 12/1998 | Gerace |
| 5,859,972 A | 1/1999 | Subramaniam et al. |
| 5,872,928 A | 2/1999 | Lewis et al. |
| 5,872,973 A | 2/1999 | Mitchell et al. |
| 5,878,432 A | 3/1999 | Misheski et al. |
| 5,889,520 A | 3/1999 | Glaser |
| 5,890,161 A | 3/1999 | Helland et al. |
| 5,890,175 A | 3/1999 | Wong et al. |
| 5,892,898 A | 4/1999 | Fujii et al. |
| 5,893,074 A | 4/1999 | Hughes et al. |
| 5,893,076 A | 4/1999 | Hafner et al. |
| 5,893,916 A | 4/1999 | Dooley |
| 5,930,512 A | 7/1999 | Boden et al. |
| 5,937,165 A | 8/1999 | Schwaller et al. |
| 5,948,064 A | 9/1999 | Bertram et al. |
| 5,949,419 A | 9/1999 | Domine et al. |
| 5,956,732 A | 9/1999 | Tsuchida |
| 5,956,736 A | 9/1999 | Hanson et al. |
| 5,960,200 A | 9/1999 | Eager et al. |
| 5,968,176 A | 10/1999 | Nessett et al. |
| 5,987,247 A | 11/1999 | Lau |
| 5,995,114 A | 11/1999 | Wegman et al. |
| 6,002,868 A | 12/1999 | Jenkins et al. |
| 6,003,047 A | 12/1999 | Osmond et al. |
| 6,014,669 A | 1/2000 | Slaughter et al. |
| 6,014,712 A | 1/2000 | Islam et al. |
| 6,016,495 A | 1/2000 | Mckeehan et al. |
| 6,016,501 A | 1/2000 | Martin et al. |
| 6,021,496 A | 2/2000 | Dutcher et al. |
| 6,029,178 A | 2/2000 | Martin et al. |
| 6,029,195 A | 2/2000 | Herz |
| 6,029,247 A | 2/2000 | Ferguson |
| 6,035,323 A | 3/2000 | Narayen et al. |
| 6,041,344 A | 3/2000 | Bodamer et al. |
| 6,044,368 A | 3/2000 | Powers |
| 6,044,465 A | 3/2000 | Dutcher et al. |
| 6,049,822 A | 4/2000 | Mittal |
| 6,052,512 A | 4/2000 | Peterson et al. |
| 6,055,538 A | 4/2000 | Kessenich et al. |
| 6,058,260 A | 5/2000 | Brockel et al. |
| 6,058,379 A | 5/2000 | Odom et al. |
| 6,061,643 A | 5/2000 | Walker et al. |
| 6,061,650 A | 5/2000 | Malking et al. |
| 6,067,568 A | 5/2000 | Li et al. |
| 6,070,184 A | 5/2000 | Blount et al. |
| 6,076,166 A | 6/2000 | Moshfeghi et al. |
| 6,079,020 A | 6/2000 | Liu |
| 6,092,199 A | 7/2000 | Dutcher et al. |
| 6,101,481 A | 8/2000 | Miller |
| 6,101,503 A | 8/2000 | Cooper et al. |
| 6,108,649 A | 8/2000 | Young et al. |
| 6,108,670 A | 8/2000 | Weida et al. |
| 6,112,228 A | 8/2000 | Earl et al. |
| 6,112,240 A | 8/2000 | Pogue et al. |
| 6,115,040 A | 9/2000 | Bladow et al. |
| 6,115,544 A | 9/2000 | Mueller |
| 6,134,548 A | 10/2000 | Gottsman et al. |
| 6,137,869 A | 10/2000 | Voit et al. |
| 6,138,086 A | 10/2000 | Rose et al. |
| 6,141,006 A | 10/2000 | Knowlton et al. |
| 6,141,010 A | 10/2000 | Hoyle |
| 6,141,647 A | 10/2000 | Meijer et al. |
| 6,151,600 A | 11/2000 | Dedrick |
| 6,151,610 A | 11/2000 | Senn et al. |
| 6,161,176 A | 12/2000 | Hunter et al. |
| 6,167,445 A | 12/2000 | Gai et al. |
| 6,167,564 A | 12/2000 | Fontana et al. |
| 6,170,009 B1 | 1/2001 | Mandal et al. |
| 6,182,212 B1 | 1/2001 | Atkins et al. |

(56) References Cited

U.S. PATENT DOCUMENTS

| | | |
|---|---|---|
| 6,182,226 B1 | 1/2001 | Reid et al. |
| 6,185,625 B1 | 2/2001 | Tso et al. |
| 6,195,794 B1 | 2/2001 | Buxton |
| 6,199,068 B1 | 3/2001 | Carpenter |
| 6,199,079 B1 | 3/2001 | Gupta et al. |
| 6,202,051 B1 | 3/2001 | Woolston |
| 6,205,480 B1 | 3/2001 | Broadhurst et al. |
| 6,208,345 B1 | 3/2001 | Sheard et al. |
| 6,209,000 B1 | 3/2001 | Klein et al. |
| 6,209,033 B1 | 3/2001 | Datta et al. |
| 6,222,535 B1 | 4/2001 | Hurd, II |
| 6,223,221 B1 | 4/2001 | Kunz |
| 6,226,649 B1 | 5/2001 | Bodamer et al. |
| 6,230,160 B1 | 5/2001 | Chan et al. |
| 6,230,194 B1 | 5/2001 | Chan et al. |
| 6,230,309 B1 | 5/2001 | Turner et al. |
| 6,233,584 B1 | 5/2001 | Purcell |
| 6,237,114 B1 | 5/2001 | Wookey et al. |
| 6,246,410 B1 | 6/2001 | Bergeron et al. |
| 6,249,905 B1 | 6/2001 | Yoshida et al. |
| 6,256,637 B1 | 7/2001 | Venkatesh et al. |
| 6,256,659 B1 | 7/2001 | Mclain, Jr. et al. |
| 6,256,678 B1 | 7/2001 | Traughber et al. |
| 6,260,068 B1 | 7/2001 | Zalewski et al. |
| 6,263,352 B1 | 7/2001 | Cohen |
| 6,266,666 B1 | 7/2001 | Ireland et al. |
| 6,269,405 B1 | 7/2001 | Dutcher et al. |
| 6,269,406 B1 | 7/2001 | Dutcher et al. |
| 6,272,673 B1 | 8/2001 | Dale et al. |
| 6,272,678 B1 | 8/2001 | Imachi et al. |
| 6,279,030 B1 | 8/2001 | Britton et al. |
| 6,282,576 B1 | 8/2001 | Lane |
| 6,282,605 B1 | 8/2001 | Moore |
| 6,286,028 B1 | 9/2001 | Cohen et al. |
| 6,286,104 B1 | 9/2001 | Buhle et al. |
| 6,301,601 B1 | 10/2001 | Helland et al. |
| 6,304,893 B1 | 10/2001 | Gish |
| 6,308,164 B1 | 10/2001 | Nummelin et al. |
| 6,308,188 B1 | 10/2001 | Bernardo et al. |
| 6,308,273 B1 | 10/2001 | Goertzel et al. |
| 6,313,835 B1 | 11/2001 | Gever et al. |
| 6,314,434 B1 | 11/2001 | Shigemi et al. |
| 6,327,677 B1 | 12/2001 | Garg et al. |
| 6,330,566 B1 | 12/2001 | Durham |
| 6,336,118 B1 | 1/2002 | Hammond |
| 6,341,287 B1 | 1/2002 | Siziklai et al. |
| 6,345,239 B1 | 2/2002 | Bowman-amuah |
| 6,349,287 B1 | 2/2002 | Hayashi |
| 6,363,398 B1 | 3/2002 | Andersen |
| 6,370,573 B1 | 4/2002 | Bowman Amuah |
| 6,370,646 B1 | 4/2002 | Goodman et al. |
| 6,381,579 B1 | 4/2002 | Gervais et al. |
| 6,389,589 B1 | 5/2002 | Mishra et al. |
| 6,401,085 B1 | 6/2002 | Gershman et al. |
| 6,401,211 B1 | 6/2002 | Brezak et al. |
| 6,405,364 B1 | 6/2002 | Bowman-amuah |
| 6,430,556 B1 | 8/2002 | Goldberg et al. |
| 6,438,514 B1 | 8/2002 | Hill et al. |
| 6,442,620 B1 | 8/2002 | Thatte et al. |
| 6,446,096 B1 | 9/2002 | Holland et al. |
| 6,453,317 B1 | 9/2002 | Lacost et al. |
| 6,457,130 B2 | 9/2002 | Hitz et al. |
| 6,466,932 B1 | 10/2002 | Dennis et al. |
| 6,469,713 B2 | 10/2002 | Hetherington et al. |
| 6,473,794 B1 | 10/2002 | Guheen et al. |
| 6,496,847 B1 | 12/2002 | Bugnion et al. |
| 6,567,818 B1 | 5/2003 | Frey et al. |
| 6,587,876 B1 | 7/2003 | Mahon et al. |
| 6,615,258 B1 | 9/2003 | Barry et al. |
| 6,625,622 B1 | 9/2003 | Henrickson et al. |
| 6,658,625 B1 | 12/2003 | Allen |
| 6,678,714 B1 | 1/2004 | Olapurath et al. |
| 6,715,128 B1 | 3/2004 | Hirashima et al. |
| 6,728,877 B2 | 4/2004 | Mackin et al. |
| 6,735,691 B1 | 5/2004 | Capps et al. |
| 6,757,696 B2 | 6/2004 | Multer et al. |
| 6,760,761 B1 | 7/2004 | Sciacca |
| 6,795,835 B2 | 9/2004 | Ricart et al. |
| 6,801,946 B1 | 10/2004 | Child et al. |
| 6,817,017 B2 | 11/2004 | Goodman |
| 6,839,766 B1 | 1/2005 | Parnafes et al. |
| 6,880,005 B1 | 4/2005 | Bell et al. |
| 6,925,477 B1 | 8/2005 | Champagne et al. |
| 6,938,158 B2 | 8/2005 | Azuma |
| 6,941,465 B1 | 9/2005 | Palekar et al. |
| 6,944,183 B1 | 9/2005 | Iyer et al. |
| 6,950,818 B2 | 9/2005 | Dennis et al. |
| 6,950,935 B1 | 9/2005 | Allavarpu et al. |
| 6,968,370 B2 | 11/2005 | Wu |
| 6,973,488 B1 | 12/2005 | Yavatkar et al. |
| 6,976,090 B2 | 12/2005 | Ben-Shaul et al. |
| 6,986,040 B1 * | 1/2006 | Kramer et al. ............ 713/155 |
| 7,028,079 B2 | 4/2006 | Mastrianni et al. |
| 7,062,781 B2 | 6/2006 | Shambroom |
| 7,080,077 B2 | 7/2006 | Ramamurthy et al. |
| 7,089,584 B1 | 8/2006 | Sharma |
| 7,100,195 B1 | 8/2006 | Underwood |
| 7,117,486 B2 | 10/2006 | Wong et al. |
| 7,133,984 B1 | 11/2006 | Dickensheets |
| 7,139,973 B1 | 11/2006 | Kirkwood et al. |
| 7,143,095 B2 | 11/2006 | Barrett et al. |
| 7,162,640 B2 | 1/2007 | Heath et al. |
| 7,171,458 B2 | 1/2007 | Brown et al. |
| 7,185,073 B1 | 2/2007 | Gai et al. |
| 7,209,970 B1 | 4/2007 | Everson et al. |
| 7,213,266 B1 | 5/2007 | Maher et al. |
| 7,216,181 B1 | 5/2007 | Jannu et al. |
| 7,231,460 B2 | 6/2007 | Sullivan et al. |
| 7,234,157 B2 * | 6/2007 | Childs et al. ............... 726/2 |
| 7,240,192 B1 * | 7/2007 | Paya et al. ............... 713/152 |
| 7,243,370 B2 * | 7/2007 | Bobde et al. ............ 726/10 |
| 7,284,043 B2 | 10/2007 | Feinleib et al. |
| 7,299,504 B1 | 11/2007 | Tiller et al. |
| 7,346,766 B2 | 3/2008 | Mackin et al. |
| 7,356,601 B1 | 4/2008 | Clymer et al. |
| 7,356,816 B2 | 4/2008 | Goodman et al. |
| 7,366,900 B2 * | 4/2008 | Shambroom ............ 713/168 |
| 7,379,996 B2 | 5/2008 | Papatla et al. |
| 7,392,390 B2 * | 6/2008 | Newcombe ............ 713/170 |
| 7,418,597 B2 * | 8/2008 | Thornton et al. ........ 713/175 |
| 7,421,555 B2 | 9/2008 | Dorey |
| 7,426,642 B2 | 9/2008 | Aupperle et al. |
| 7,428,583 B1 | 9/2008 | Lortz et al. |
| 7,440,962 B1 | 10/2008 | Wong et al. |
| 7,444,401 B1 | 10/2008 | Keyghobad et al. |
| 7,467,141 B1 | 12/2008 | Steele et al. |
| 7,478,418 B2 | 1/2009 | Supramaniam et al. |
| 7,483,979 B1 | 1/2009 | Prager |
| 7,487,535 B1 | 2/2009 | Isaacson et al. |
| 7,519,813 B1 | 4/2009 | Cox et al. |
| 7,584,502 B2 | 9/2009 | Alkove et al. |
| 7,591,005 B1 | 9/2009 | Moore |
| 7,617,501 B2 | 11/2009 | Peterson et al. |
| 7,650,496 B2 * | 1/2010 | Thornton et al. ........ 713/158 |
| 7,650,497 B2 * | 1/2010 | Thornton et al. ........ 713/158 |
| 7,653,794 B2 | 1/2010 | Michael et al. |
| 7,661,027 B2 | 2/2010 | Langen et al. |
| 7,673,323 B1 | 3/2010 | Moriconi |
| 7,690,025 B2 | 3/2010 | Grewal et al. |
| 7,716,077 B1 * | 5/2010 | Mikurak ................ 705/7.12 |
| 7,765,187 B2 | 7/2010 | Bergant et al. |
| 7,805,721 B2 | 9/2010 | Feinleib et al. |
| 7,865,959 B1 * | 1/2011 | Lewis .................... 726/26 |
| 7,895,332 B2 | 2/2011 | Vanyukhin et al. |
| 7,904,949 B2 | 3/2011 | Bowers et al. |
| 7,987,455 B1 | 7/2011 | Senner et al. |
| 8,024,360 B2 | 9/2011 | Moore |
| 8,086,710 B2 | 12/2011 | Vanyukhin et al. |
| 8,087,075 B2 | 12/2011 | Peterson et al. |
| 8,141,138 B2 | 3/2012 | Bhatia et al. |
| 8,234,697 B2 * | 7/2012 | Chhabra ................ 726/6 |
| 8,245,242 B2 | 8/2012 | Peterson et al. |
| 8,346,908 B1 | 1/2013 | Vanyukhin et al. |
| 8,429,712 B2 | 4/2013 | Robinson et al. |

(56) References Cited

U.S. PATENT DOCUMENTS

| | | |
|---|---|---|
| 8,533,744 B2 | 9/2013 | Peterson et al. |
| 8,584,218 B2 | 11/2013 | Peterson et al. |
| 8,635,670 B2* | 1/2014 | Olsson et al. ............... 726/4 |
| 2001/0034733 A1 | 10/2001 | Prompt et al. |
| 2002/0055949 A1 | 5/2002 | Shiomi et al. |
| 2002/0078005 A1 | 6/2002 | Shi et al. |
| 2002/0112178 A1 | 8/2002 | Scherr |
| 2002/0129274 A1 | 9/2002 | Baskey et al. |
| 2002/0133723 A1* | 9/2002 | Tait ............... 713/201 |
| 2002/0138572 A1 | 9/2002 | Delany et al. |
| 2002/0169986 A1 | 11/2002 | Lortz |
| 2002/0169988 A1 | 11/2002 | Vandergeest et al. |
| 2002/0174366 A1 | 11/2002 | Peterka et al. |
| 2002/0178377 A1 | 11/2002 | Hemsath et al. |
| 2002/0184536 A1 | 12/2002 | Flavin |
| 2003/0009487 A1 | 1/2003 | Prabakaran et al. |
| 2003/0018913 A1 | 1/2003 | Brezak et al. |
| 2003/0023587 A1 | 1/2003 | Dennis et al. |
| 2003/0028611 A1 | 2/2003 | Kenny et al. |
| 2003/0033535 A1 | 2/2003 | Fisher et al. |
| 2003/0065940 A1 | 4/2003 | Brezak et al. |
| 2003/0065942 A1 | 4/2003 | Lineman et al. |
| 2003/0110397 A1 | 6/2003 | Supramaniam et al. |
| 2003/0115186 A1 | 6/2003 | Wilkinson et al. |
| 2003/0115313 A1 | 6/2003 | Kanada et al. |
| 2003/0115439 A1 | 6/2003 | Mahalingam et al. |
| 2003/0149781 A1 | 8/2003 | Yared et al. |
| 2003/0177388 A1 | 9/2003 | Botz et al. |
| 2003/0188036 A1 | 10/2003 | Chen et al. |
| 2003/0226036 A1 | 12/2003 | Bivens et al. |
| 2003/0229783 A1 | 12/2003 | Hardt |
| 2004/0010519 A1 | 1/2004 | Sinn et al. |
| 2004/0059953 A1 | 3/2004 | Purnell |
| 2004/0078569 A1 | 4/2004 | Hotti |
| 2004/0088543 A1 | 5/2004 | Garg et al. |
| 2004/0098595 A1 | 5/2004 | Aupperle et al. |
| 2004/0098615 A1 | 5/2004 | Mowers et al. |
| 2004/0111515 A1 | 6/2004 | Manion et al. |
| 2004/0111643 A1 | 6/2004 | Farmer |
| 2004/0117382 A1 | 6/2004 | Houseknecht et al. |
| 2004/0123146 A1 | 6/2004 | Himmel et al. |
| 2004/0126748 A1 | 7/2004 | Ho et al. |
| 2004/0128506 A1 | 7/2004 | Blakley et al. |
| 2004/0128541 A1 | 7/2004 | Blakley et al. |
| 2004/0128542 A1 | 7/2004 | Blakley et al. |
| 2004/0139050 A1 | 7/2004 | Barrett et al. |
| 2004/0139081 A1 | 7/2004 | Barrett et al. |
| 2004/0199795 A1 | 10/2004 | Grewal et al. |
| 2004/0226027 A1 | 11/2004 | Winter |
| 2004/0260565 A1 | 12/2004 | Zimniewicz et al. |
| 2004/0260651 A1 | 12/2004 | Chan et al. |
| 2005/0010547 A1 | 1/2005 | Carinci et al. |
| 2005/0044409 A1 | 2/2005 | Betz et al. |
| 2005/0055357 A1 | 3/2005 | Campbell |
| 2005/0060397 A1 | 3/2005 | Barthram et al. |
| 2005/0086457 A1 | 4/2005 | Hohman |
| 2005/0091068 A1 | 4/2005 | Ramamoorthy et al. |
| 2005/0091213 A1 | 4/2005 | Schutz et al. |
| 2005/0091250 A1 | 4/2005 | Dunn et al. |
| 2005/0091284 A1 | 4/2005 | Weissman et al. |
| 2005/0091290 A1 | 4/2005 | Cameron et al. |
| 2005/0108579 A1 | 5/2005 | Isaacson et al. |
| 2005/0114653 A1* | 5/2005 | Sudia ............... 713/158 |
| 2005/0114701 A1 | 5/2005 | Atkins et al. |
| 2005/0125798 A1 | 6/2005 | Peterson |
| 2005/0144463 A1 | 6/2005 | Rossebo et al. |
| 2005/0160423 A1 | 7/2005 | Bantz et al. |
| 2005/0193181 A1 | 9/2005 | Kaneda et al. |
| 2005/0198303 A1 | 9/2005 | Knauerhase et al. |
| 2005/0204143 A1 | 9/2005 | Ellington |
| 2005/0223216 A1 | 10/2005 | Chan et al. |
| 2005/0246554 A1 | 11/2005 | Batson |
| 2005/0267938 A1 | 12/2005 | Czeczulin |
| 2005/0268309 A1 | 12/2005 | Krishnaswamy et al. |
| 2005/0283443 A1 | 12/2005 | Hardt |
| 2005/0283614 A1 | 12/2005 | Hardt |
| 2006/0004794 A1 | 1/2006 | Pizzo et al. |
| 2006/0005229 A1 | 1/2006 | Palekar et al. |
| 2006/0010445 A1 | 1/2006 | Peterson et al. |
| 2006/0015353 A1 | 1/2006 | Reese |
| 2006/0021017 A1 | 1/2006 | Hinton et al. |
| 2006/0026195 A1 | 2/2006 | Gu et al. |
| 2006/0034494 A1 | 2/2006 | Holloran |
| 2006/0080729 A1* | 4/2006 | Koh et al. ............... 726/5 |
| 2006/0085483 A1 | 4/2006 | Mooney et al. |
| 2006/0116949 A1 | 6/2006 | Wehunt et al. |
| 2006/0130065 A1 | 6/2006 | Chin et al. |
| 2006/0161435 A1 | 7/2006 | Atef et al. |
| 2006/0174350 A1 | 8/2006 | Roever et al. |
| 2006/0184401 A1 | 8/2006 | DelGaudio et al. |
| 2006/0200424 A1 | 9/2006 | Cameron et al. |
| 2006/0200504 A1 | 9/2006 | Lo |
| 2006/0224611 A1 | 10/2006 | Dunn et al. |
| 2006/0248099 A1 | 11/2006 | Barrett et al. |
| 2006/0265740 A1 | 11/2006 | Clark et al. |
| 2006/0282360 A1 | 12/2006 | Kahn et al. |
| 2006/0282461 A1 | 12/2006 | Marinescu |
| 2006/0294151 A1 | 12/2006 | Wong et al. |
| 2007/0011136 A1 | 1/2007 | Haskin et al. |
| 2007/0038596 A1 | 2/2007 | Pizzo et al. |
| 2007/0083917 A1 | 4/2007 | Peterson et al. |
| 2007/0100980 A1 | 5/2007 | Kataoka et al. |
| 2007/0101415 A1 | 5/2007 | Masui |
| 2007/0143430 A1 | 6/2007 | Johnson et al. |
| 2007/0143836 A1 | 6/2007 | Bowers et al. |
| 2007/0150448 A1 | 6/2007 | Patnode |
| 2007/0156766 A1 | 7/2007 | Hoang et al. |
| 2007/0156767 A1 | 7/2007 | Hoang et al. |
| 2007/0180448 A1 | 8/2007 | Low et al. |
| 2007/0180493 A1 | 8/2007 | Croft et al. |
| 2007/0192843 A1 | 8/2007 | Peterson |
| 2007/0255814 A1 | 11/2007 | Green et al. |
| 2007/0288992 A1 | 12/2007 | Robinson |
| 2008/0104220 A1 | 5/2008 | Vanyukhin |
| 2008/0104250 A1 | 5/2008 | Vanyukhin |
| 2008/0133533 A1 | 6/2008 | Ganugapati et al. |
| 2008/0162604 A1 | 7/2008 | Soulet et al. |
| 2008/0215867 A1 | 9/2008 | Mackin et al. |
| 2009/0006537 A1 | 1/2009 | Palekar et al. |
| 2009/0216975 A1 | 8/2009 | Halperin et al. |
| 2010/0050232 A1 | 2/2010 | Peterson |
| 2011/0093570 A1 | 4/2011 | Mackin et al. |
| 2011/0282977 A1 | 11/2011 | Peterson |
| 2011/0283273 A1 | 11/2011 | Peterson |
| 2012/0192256 A1 | 7/2012 | Peterson et al. |
| 2012/0215899 A1 | 8/2012 | Peterson |
| 2012/0297035 A1 | 11/2012 | Peterson |

OTHER PUBLICATIONS

Antonelli, C.J.; Doster, W.A.; Honeyman, P. Access Control in a Workstation-Based Distributed Computing Environment. Proceedings, IEEE Workshop on Experimental Distributed Systems. Pub. Date: 1990. Relevant pp. 13-19. http://ieeexplore.ieee.org/stamp/stamp.jsp?tp=&arnumber=138044.*

Appenzeller, Guido; Roussopoulos, Mema; Baker, Mary. User-Friendly Access Control for Public Network Ports. Proceedings, INFOCOM '99. vol. 2. Pub. Date: 1999. Relevant pp. 699-707. http://ieeexplore.ieee.org/stamp/stamp.jsp?tp=&arnumber=751456.*

Olson, Lars; Winslett, Marianne; Tonti, Gianluca. Trust Negotiation as an Authorization Service for Web Services. 22nd International Conference on Data Engineering Workshops. Pub. Date: 2006. http://ieeexplore.ieee.org/stamp/stamp.jsp?tp=&arnumber=1623816.*

Samar, Vipin. Single Sign-On Using Cookies for Web Applications. Proceedings, IEEE 8th International Workshops on Enabling Technologies: Infrastructure for Collaborative Enterprises, 1999 (WET ICE '99). Relevant pp. 158-163. http://ieeexplore.ieee.org/stamp/stamp.jsp?tp=&arnumber=805192.*

Antonelli, C.J.; Doster, W.A.; Honeyman, P. Access Control in a Workstation-Based Distributed Computing Environment. Proceedings, IEEE Workshop on Experimental Distributed Systems, 1990.

(56) References Cited

OTHER PUBLICATIONS

Relevant pp. 13-19. http://ieeexplore.ieee.org/stamp/stamp.jsp?tp=&arnumber=138044.*
Moore, Patrick C.; Johnson, Wilbur R.; Detry, Richard J. Adapting Globus and Kerberos for a Secure ASCI Grid. ACM/IEEE 2001 Conference on Supercomputing. http://ieeexplore.ieee.org/stamp/stamp.jsp?tp=&arnumber=1592830.*
U.S. Appl. No. 12/200,814, filed Aug. 28, 2008, Eyes et al.
"Description of Digital Certificates", Jan. 23, 2007, http://www.support.microsoft.com/kb/195724.
"Directory Administrator", http://diradmin.open-it.org/indexlphp, p. 1-3. Dec. 15, 2004.
"Innovation Report—Windows Group Policy Protocols" Jul. 31, 2006.
"Kerberos Module for Apache", http://modauthkerb.sourceforge.net/.
"LDAP Linux HOWTO", http://tldp/org/HOWTO/LDAP-HOWTO/, p. 1-2. Mar. 5, 2004.
"Lnux Authentication Against Active Directory", http://laaad/sourceforge.netlen/home/htm, p. 1-2. Dec. 15, 2004.
"NegotiateAuth", http://negotiateauth,mozdev.org/ Jul. 8, 2010.
"Optimization Techniques for Trusted Semantic Interoperation", Final Technical Report, Air Force Research Laboratory. Published May 1998.
"Project: AD4Unix: Summary", http://sourceforge.netlprojects/adunixl, p. 1-3. Dec. 15, 2004.
"Replacing NIS with Kerberos and LDAP", http://ofb.netHhess/krbldap/, p. 1-2. Dec. 15, 2004.
"Sadma", http://sadmas.sourceforge.netlen/indexlhtml. p. 1-2. Dec. 15, 2004.
"Sun Enterprise Authentication Mechanism Data Sheet", http://wwws.sun.com/jsp_utils/Printpage.jsp?url, pp. 1-4. Dec. 15, 2004.
Vintela Extends the Reach of Microsoft Group Policy to Unix and Linux; Vintela Group Policy (VGP) Provides a Framework for Unix and Linux Policy-Based Management Through the Popular Windows Group Policy System., PR Newswire, Sep. 13, 2004.
A. Leonard, "Embrace, extend, censor", Originally published May 11, 2000 on salon.com, http://archive.salon.com/tech/log/2000/05/11/slashdot_censor/.
Aelita Software Domain Migration Wizard 6.0 User's Guide, Aug. 21, 2003.
Affidavit filed with Amendment and Response to Office Action filed Jan. 14, 2008 in U.S. Appl. No. 10/888,845.
AIX 5L Differences Guide Version 5.2 Edition Published Dec. 24, 2002, Excerpt http://proquest.safaribooksonline.com/0738427047/ch09 1ev1sec13.
Akhgar et al., Secure ICT Services for Mobile and Wireless Communications: A Federated Global Identity Management Framework, 2006 IEEE.
Alan H. Harbitter et al., "Performance of Public-Key-Enabled Kerberos Authentication In Large Networks", Proceedings of the IEEE symposium on Security and Privacy. 2001.
Amendment and Response to Office Action filed on Jan. 14, 2008 with claims as amended in U.S. Appl. No. 10/888,845.
Antti Tikkanen, "Active Directory and nss_idap for Linux: Centralized er Management," printed from http://www.hut.fi/cc/docskerberos/nss_ldap/htm, pp. 1-11, 2004.
Apurva Kumar, "The OpenLDAP Proxy Cache," IBM, India Research Lab, at least as early as May 2003.
Authentication, from Pieces of the Puzzle, Chapter 2, p. 12. (Exhibit IV to U.S. Appl. No. 95/001,872, Inter Partes Reexamination Renewed Petition (Third Party Requester to Response to Mar. 1, 2012 Office Action), dated Aug. 9, 2012.
Buell, D.A. et al., "Identity management", Internet Computing, IEEEvol. 7, Issue 6, Nov.-Dec. 2003 pp. 26-28.
Centrify DirectControl Administrator's Guide Version 2.0, Aug. 15, 2005.
Chapter 9 Authentication Protocols, Distributed System & Network Security Lab, Department of Computer Science & Information Engineering, National Chiao Tung University, pp. 21-22. 1991.

COSuser—Identity management and user provisioning for Unix, Linux and Microsoft Windows® http://www.cosuser.com/ May 24, 2010.
Damiani, E., et al, "Managing multiple and dependable identities" Internet Computing, IEEEvol. 7, Issue 6, Nov.-Dec. 2003 pp. 29-37.
David "Del" Elson, "Active Directory and Linux," printed from http://www.securityfoc.com/printable/infoc /1563, pp. 1-11, 2002.
David F. Carr, "What's Federated Identity Management?", eWeek, Nov. 10, 2003, http://www.eweek.com/printarticle/O,1761.a-111811,00.asp.
Dennis, Disconnect Login (Was: FC3 Bug Week—Help Wanted) (Sep. 24, 2004).
Description of Digital Certificates, Jan. 23, 2007, available at http://www.support.microsoft.com/kb/195724.
Designing Network Security Published May 7, 1999. Excerpt http://proquest.safaribooksonline.com/1578700434/ch02lev1sec1.
Documentation for Kerberos V5 release krb5-1.3, Copyright 1985-2002, Installation Guide: http://web.mit.edu/Kerberos/krb5-1.6/krb5-1.6/doc/krb5-install.html.
Documentation for Kerberos V5 release krb5-1.3, Copyright 1985-2002, Installation Guide: http://web.mit.edu/Kerberoslkrb5-1.3/krb5-1.3/doc/krb5-install.html—System Administrator's Guide: http://web.mit.edu/Kerberos/krb5-1.3/krb5-1.3/doc/krb5-admin.html—UNIX User's Guide: http://web.mit.edu/Kerberos/krb5-1.3/krb5-1.3/doc/krb5- er.html.
Documentation for Kerberos V5 release krb5-1.3, Copyright 1985-2002, System Administrator's Guide: http://web.mit.edu/Kerberos/krb5-1.6/krb5-1.6/doc/krb5-admin.html.
Documentation for Kerberos V5 release krb5-1.3, Copyright 1985-2002, UNIX User's Guide: http://web.mit.edu/kerberos/www/krb5-1.2/krb5-1.2.6/doc/user-guide.html.
European Office Action, Application No. 05728119.8-1243 dated Apr. 9, 2009.
European Patent Office Communication pursuant to Article 94(3) EPC dated Apr. 9, 2009.
Fabini et al., "IMS in a Bottle: Initial Experiences from an OpenSER-based Prototype Implementation of the 3GPP IP Multimedia Subsystem" Mobile Business, 2006. ICMB '06. International Conference on Publication Date: 2006; On pp. 13-13.
Garman, "Kerberos—The Definitive Guide," Aug. 2003, O'Reilly & Associates, Inc.
Get to One Options for moving from multiple, Unix identities to a single, AD-based authentication infrastructure with Vintela Authentication Serviceshttp://www.quest.com/Vintela_Authentication_Services/migration_options_VAS.aspx May 24, 2010.
Hank Simon, "SAML:The Secret to Centralized Identity Management", Dec. 2004, http://intelligententerprise.com/showArticle.jhtml?articleID=54200324.
IBM SecureWay Policy Director, 1999. (4 pages).
IBM z/OS V1R1.0-V1R12.0 DCE Application Development Reference: dce_ace_is_cient_authorized API call: URL: http://publib.boulder.ibm.com/infocenter/zos/v1r12/topic/com.ibm.zos.r12.euvmd00/euva6a00646.htm, Copyright IBM Corporation 1990,2010, (2 pages).
Identity Management for UNIX http://technet2.microsoft.com/WindowsServer/en/library/ab66b7d2-9cfb-4d76-b707-30a5e0dd84f31033.mspx?mfr=true Aug. 22, 2005.
Implementing Registry-Based Group Policy for Applications, Microsoft Windows 2000 Server. White Paper. 2000.
International Preliminary Report on Patentability and Written Opinion for International Application No. PCT/US2006/039302, mailed on Apr. 2, 2009, in 7 pages.
International Search Report and Written Opinion from International Patent Appl. No. PCT/US2009/038394, mailed Oct. 6, 2009, in 13 pages.
International Search Report in International Application No. PCT/US2006/039302, mailed on Jul. 3, 2008.
International Search Report PCT/US2005/008342 , mailed on Nov. 9, 2006.
Introduction to Group Policy in Windows Server 2003, Microsoft Corporation, Published Apr. 2003.
J. Barr, "The Gates of Hades: Microsoft attempts to co-opt Kerberos", Published Apr. 2000 as verified by the Internet Archive,

(56) References Cited

OTHER PUBLICATIONS http://web.archive.org/web/20000619011652/http://www.linuxworld.com/linuxworld/lw-2000-04/lw-04-vcontrol_3.html.
J. Brezak, "HTTP Authentication: SPNEGO Access Authentication as Implemented in Microsoft Windows 2000," http://Meta.cesnet.cz/cms/opencms/en/docs/software/devel/draft-brezek-spnego-http-04.xt. pp. 1-6. 2002.
J. Kohl et al. "RFC 1510: The Kerberos Network Authentication Service (V5)", Published Sep. 1993, http://ietfreport.isoc.org/rfc/PDF/rfc1510.pdf.
Jan De Clercq, "Win.NET Server Kerberos", http://www.winnetmag.com/WindowsSecurity/ ArticlesIArticleID/26450/pg/3/3.html. Sep. 17, 2002.
John Brezak, "Interoperability with Microsoft Windows 2000 Active Directory and Kerberos Services," printed from http://msdn.microsft.com/library/en- /dnactdir/html/kerberossamp.asp?frame=true, pp. 1-4, 2000.
Kerberos, PACs, and Microsoft's Dirty Tricks Originally posted to slashdot.org on May 2, 2000, http://slashdot.org/comments.pl?sid=5268&threshold=1&commentsort=O&mode=thread&cid=1096250.
Langella, S. et al., "Dorian: Grid Service Infrastructure for Identity Management and Federation", Computer-Based Medical Systems, 2006. CBMS 2006. 19th IEEE International Symposium on Jun. 22-23, 2006 pp. 756-761.
Li, M., et al., "Identity management in vertical handovers for UMTS-WLAN networks", Mobile Business, 2005. ICMB 2005. International Conference onJul. 11-13, 2005 pp. 479-484.
LinuX® and Windows® Interoperability Guide, Published Dec. 14, 2001, Excerpt http://proquest.safaribooksonline.com/0130324779/ch18/lev1sec3.
Lowe-Norris, Alistair G., Windows 2000 Active Directory, Chapters 8 and 9, pp. 177-245, Jan. 2000.
Matsunaga et al, "Secure Authentication System for Public WLAN Roaming, Proceedings of the 1st ACM international workshop on Wireless mobile applications and services on WLAN hotspots," San Diego, CA, A, Year of Publication: 2003, p. 113-121.
Matthew Hur, "Session Code: ARC241 architecture & infrastructure", Microsoft Corporation. Oct. 26, 2003.
MCSE in a Nutshell: The Windows 2000 Exams Published Feb. 2001. Excerpt http://proquest.safaribooksonline.com/0596000308/mcseian-CHP-13-SECT-1.
Microsoft Corp., Implementing Registry-Based Group Policy for Applications, 2000.
Microsoft Corp., Introduction to Group Policy in Windows Server 2003, 2003.
Microsoft: CATIA Migration from UNIX to Windows, Overview, Jul. 18, 2003. (3 pages).
Microsoft: CATIA Migration from UNIX to Windows, Overview, Jul. 18, 2003, Microsoft, Chapter 8, Windows-Unix Interoperability and Data Sharing. (21 pages).
Mikkonen, H. et al., "Federated Identity Management for Grids" Networking and Services, 2006. ICNS '06. International conference onJul. 16-18, 2006 pp. 69-69.
Mont, M.C. et al., "Towards accountable management of identity and privacy: sticky policies and enforceable tracing services", Database and Expert Systems Applications, 2003. Proceedings. 14th International Workshop on Sep. 1-5, 2003 pp. 377-382.
NCSA Introduction to Kerberos 5, All right reserved Board of Trustees of the University of Illinois Page last updated May 21, 2002 http://www.ncsa.uiuc.edu/UserInfo/Resources/Sofiware/kerberosold/introduction.html.
Neuman et al., "RFC 4120—The Kerberos Network Authentication Service V5," Network Working Group Jul. 2005.
Neuman, et al.: "Kerberos: An Authentication Service for Computer Networks", IEEE Communications Magazine, vol. 32, Issue 9, Pub. Date Sep. 1994, relevant pp. 33-38.
O'Reily publications "Unix & Internet Security", Apr. 1996. (3 pages).

PADL Software Pty Ltd., http://www.padl.com/productsIXAD.html, pp. 1-3. Dec. 15, 2004.
PADL Software Pty Ltd., Pam_ccreds readme, (Apr. 11, 2004) (pan_crreds).
Phiri, J. et al., "Modelling and Information Fusion in Digital Identity Management Systems" Networking, International Conference on Systems and International Conference on Mobile Communications and Learning Technologies, 2006. ICN/ICONS/MCL 2006. International Conference on Apr. 23-29, 2006 pp. 181-181.
Quest Software; "UNIX Identity Migration Wizard User Guide", 2006.
Quest Vintela Authentication Services Administrator's Guide Version 3.1, Sep. 2006.
Radeke, E., et al. "Framework for object migration in federated database systems", Cooperation Univ. of Paderborn, Germany, Parallel and Distributed Information Systems, 1994., Proceedings of the Third International Conference on Publication Date: Sep. 28-30, 1994, On pp. 187-194.
Request for Withdrawal of the European Application No. 05728119.8 on Feb. 19, 2010.
Response to Communication pursuant to Article 94(3) EOC filed Sep. 9, 2009 in EP 05728119.8.
RFC 4120—"The Kerberos Network Authentication Service V5," Neuman et al., Network Working Group, Jul. 2005.
Sandrasegaran, Hsang, Identity Management in Vertical Handovers for UMTS-WLAN Networks, 2005 IEEE.
Schroeder, SDSC's Installation and Development of Kerberos, San Diego Supercomputer Center, San Diego, CA, Sep. 20, 1995, p. 1-11.
Search Security, "Search Security.com Definitions", Jun. 4, 2007, http://searchsecurity.techtarget.com/sDefinition/0,,sid14_gci212437,00.html.
Shim, S.S.Y et al., "Federated identity management" Computer; vol. 38, Issue 12, Dec. 2005 pp. 120-122.
Shin, D. et al., "Ensuring information assurance in federated identity management", Performance, Computing, and Communications, 2004 IEEE International Conference on 2004 pp. 821-826.
Siddiqi, J. et al., "Secure ICT Services for Mobile and Wireless Communications: A Federated Global Identity Management Framework", Information Technology: New Generations, 2006. ITNG 2006. Third International Conference on Apr. 10-12, 2006 pp. 351-357.
Sixto Ortiz, Jr., "One-Time Password Technology", vol. 29, Issue 15, Apr. 13, 2007, http://www.processor.com/editorial/article.asp?article=articles%2Fp2915%2F30p15%2F30p15.asp.
Subject 2.15. What do I need to do to setup cross-realm authentication?, http://www.cmf.nrl.navy.mil/CCS/people/kenh/kerberos-fag.html. Jul. 8, 2010.
The SLAPD and SLURPD Administrator's Guide, University of Michigan Release 3.3 Apr. 30, 1996, available at http://www.umich.edu/~dirsvcs/ldap/doc/guides/slapd/guide.pdf.
Turbo Fredriksson, "LDAPv3." printed from http://www.bayour.com/LDAPv3-HOWTO.html, pp. 2-65, 2001.
Ventuneac et al., A policy-based security framework for Web-enabled applications, Proceeding ISICT '03, Proceedings of the 1st International Symposium on Information and Communication Technologies, pp. 487-492.
Vintela Group Policy Technology Preview, "Extending the Power of Group Policy and Windonws Active Directory to configuration of Unix and Linux users and systems", Version 0.1, May 2004.
Wedgetail Communications; "Security Assertion Markup Language (SAML)", 2004.
Weitzner, D.J., "In Search of Manageable Identity Systems", IEEE Internet Computing, vol. 10, Issue 6, Nov.-Dec. 2006 pp. 84-86.
Windows 2000 Kerberos Authentication White Paper, Microsoft Windows 2000 Server, pp. 1-5 and 41-42. Jul. 12, 2010.
Withers, Integrating Windows 2000 and UNIX Using Kerberos, The Journal for UNIX Systems Administrators, vol. 10, No. 12, Dec. 2001. http://seann.herdejurgen.com/resume/samag.com/html/v10/i12/a5.htm.

* cited by examiner

DISCONNECTED CREDENTIAL VALIDATION USING PRE-FETCHED SERVICE TICKETS

BACKGROUND OF THE INVENTION

1. Field of the Invention

The present invention relates to computer network authentication services. Specifically, the invention relates to apparatus, methods, and systems for providing disconnected validation of login credentials.

2. Description of the Related Art

In recent years, computer networks have been increasingly significant in terms of the quantity and sensitivity of the data communicated. Once used primarily for academic purposes, the Internet has become a vehicle for communicating such confidential information as credit card transactions, bank account transactions, and corporate intellectual property. The same applies to proprietary corporate networks. As the quantity and value of the data being communicated has increased, the threats to the security of this data have increased proportionately.

One of the technologies developed to address data security threats is Kerberos authentication. Kerberos provides a means for secure authentication of a user's credentials as well as means to protect sensitive data communicated across an insecure network. Kerberos authentication relies on the existence of a Kerberos server that certifies a user's identity to network services utilized by an application the user is running. Services that use Kerberos to authenticate users are said to be "Kerberized."

While the need for security has increased, so has the need for flexibility. Users are increasingly mobile and may access network services through a variety of locations and devices. Networks are increasing in size and complexity and are often in a state of flux and change. Such size and flexibility provides challenges to network security and reliability. For example, changes in policy or accounts must be effected across larger networks and a greater number of devices. Furthermore, an authentication server such as a Kerberos server may be temporarily inaccessible to some or all of a network resulting in a need for "disconnected" authentication of a user.

While various solutions for disconnected authentication have been developed, such solutions typically require at least one previous login by the user at a particular device at a time that the authentication server is accessible. Such a requirement is impractical given the sheer number of networked devices and the frequency of changes in network configuration and login accounts.

Given the issues and challenges related to providing authentication services and the shortcomings of currently available solutions, a need exists for an apparatus, method, and system to validate login credentials of a user or group member without requiring a previous login from a particular device or immediate access to an authentication server.

SUMMARY OF THE INVENTION

The present invention has been developed in response to the present state of the art, and in particular, in response to the problems and needs in the art that have not yet been fully solved by currently available authentication systems. Accordingly, the present invention has been developed to provide an apparatus, method, and system to validate login credentials without requiring a previous login via the login device or immediate access to an authentication server.

In one aspect of the present invention, a method to validate login credentials of a selected party includes authenticating a login device with an authentication service, obtaining a service ticket from the authentication service for the login device to communicate with the selected party (referred to herein as a user service ticket), and storing the user service ticket for subsequent authentication of the selected party by the login device. Authenticating the login device may include providing valid credentials and a valid timestamp to the authentication service. Tickets to communicate with one or more selected parties such as users or group members may be pre-fetched by the login device without requiring access to the credentials of the users or group members.

In another aspect of the present invention, an apparatus to validate login credentials includes a ticket pre-fetch module configured to authenticate a login device with an authentication service and obtain (i.e. pre-fetch) user service tickets from the authentication service for the login device to communicate with one or more selected parties such as users and group members. The apparatus may also include a ticket cache configured to store the pre-fetched tickets for subsequent authentication of the selected parties by the login device.

In certain embodiments, the apparatus also includes an authentication module configured to authenticate login credentials against pre-fetched tickets stored in the ticket cache. Login credentials may be received and validated by the authentication module despite unavailability of an authentication service. In certain embodiments, authenticating login credentials against a pre-fetched user service ticket includes generating a key from the login credentials and decrypting a portion of the pre-fetched user service ticket using the generated key. Furthermore, authentication data within the pre-fetched user service ticket may be compared with known data to confirm the validity of the pre-fetched user service ticket. In one embodiment, authenticating a party against a pre-fetched user service ticket may occur by using a pre-fetched user service ticket corresponding to the selected party to construct a Kerberos AP-REQ message structure and invoking a validation function that processes the Kerberos AP-REQ message structure.

In one embodiment, a list of users and/or groups is retrieved from a known source such as a configuration file and user service tickets to communicate with each user and group member are pre-fetched and stored in the ticket cache associated with the login device. The pre-fetched user service tickets may also be refreshed within the ticket cache as need by obtaining new user service tickets from the authentication service. Refreshing the user service tickets may keep the ticket cache better synchronized with changes in user credentials registered with the authentication server. In one embodiment, pre-fetched user service tickets may be refreshed in response to selected events such as expiration of a selected interval, a login request, a change in user credentials, and a reboot cycle.

In another aspect of the present invention, a system to validate login credentials includes an authentication server configured to provide an authentication service, and a login device comprising the ticket pre-fetch module, the authentication module, and the ticket cache previously described. The authentication server may be a domain controller. In one embodiment, the authentication server is a Kerberos key distribution center (KDC) and the pre-fetched user service tickets may be Kerberos service tickets.

The present invention advantageously facilitates disconnected authentication of login credentials without requiring a previous login session. It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
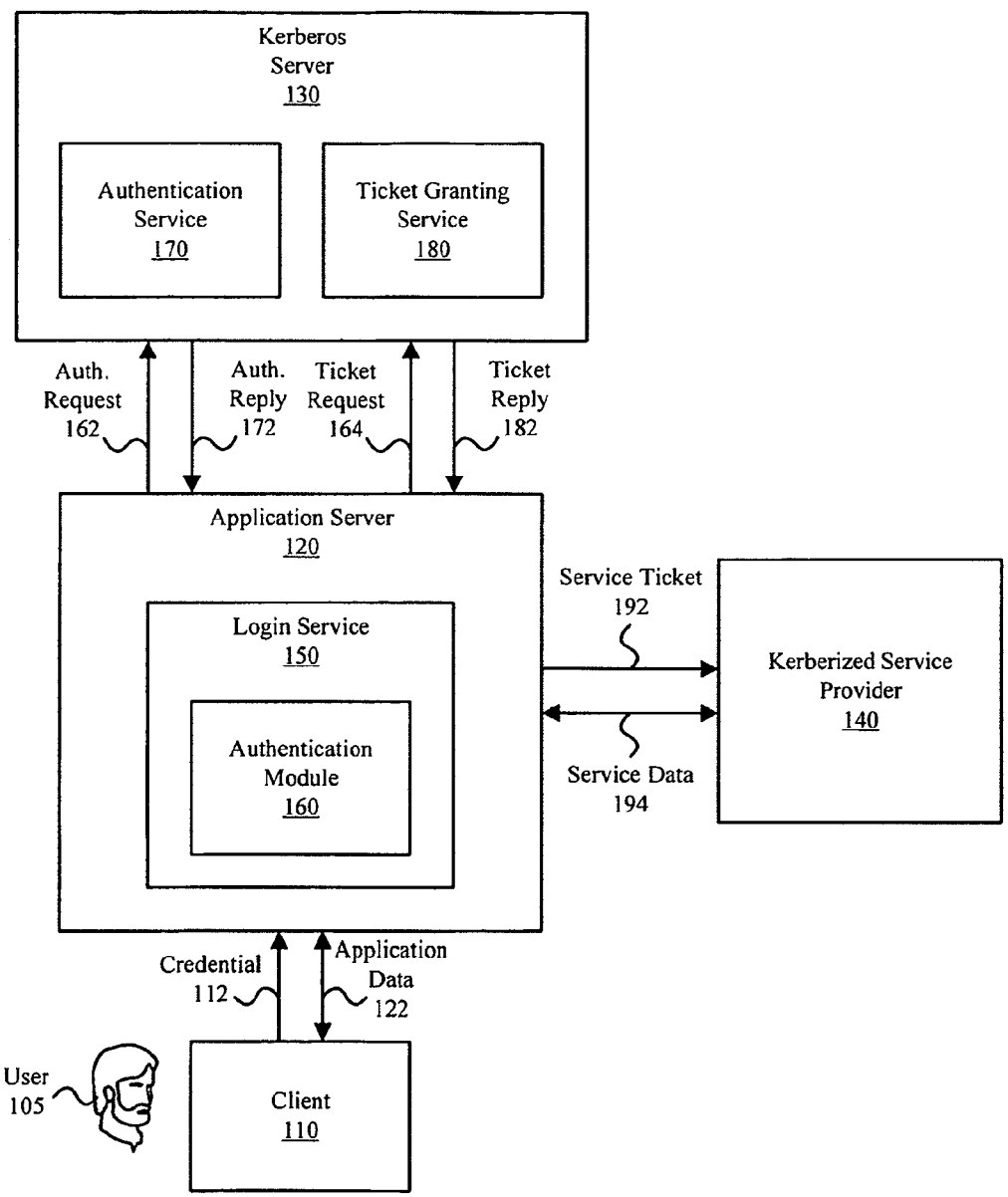
FIG. 1 is a block diagram illustrating a typical prior art authentication system.

It will be readily understood that the components of the present invention, as generally described and illustrated in the Figures herein, may be arranged and designed in a wide variety of different configurations. Thus, the following more detailed description of the embodiments of the apparatus, method, and system of the present invention, as represented in FIGS. 3 through 6, is not intended to limit the scope of the invention, as claimed, but is merely representative of selected embodiments of the invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

The features, structures, or characteristics of the invention described throughout this specification may be combined in any suitable manner in one or more embodiments. For example, reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," or similar language throughout this specification do not necessarily all refer to the same embodiment and the described features, structures, or characteristics may be combined in any suitable manner in one or more embodiments.

The present invention sets forth an apparatus, system and method to validate credentials provided to a login device without requiring immediate connectivity to an authentication server or a previous login on the login device.

FIG. 1 is a block diagram illustrating a typical prior art authentication system 100. As depicted, the authentication system 100 includes a user 105, a client 110, an application server 120, an authentication server 130, and a service provider 140. The authentication system 100 facilitates providing applications and services to the user 105 in a secure manner.

The application server 120 may include a login service 150 with an authentication module 160. In the depicted embodiment, the application server 120 is configured to facilitate authentication of users and group members. In one embodiment, the authentication module 160 is a pluggable authentication module. The authentication module may receive one or more credentials such as a username and password from the user 105 via the client 110. Alternately, the user 105 may be stationed at the application server 120 and directly provide the credentials 112 to the login service 150 and the authentication module 160.

In response to the received credentials 112, the authentication module 160 may provide an authentication request 162 to the authentication server 130. In one embodiment, the authentication server 130 is a Kerberos server that may function as a domain controller such as a Windows™ domain controller. In the depicted embodiment, the authentication server 130 includes an authentication service 170, and a ticket granting service 180.

The authentication service 170 may receive the authentication request 162, for example a Kerberos AS_REQ message, and provide an authentication reply 172 such as a Kerberos AS_REP message. In response, the authentication module 160 may use the authentication reply 172 to determine the authenticity of the user provided credentials 112. In one embodiment, the authentication module 160 derives a key (not shown) from the credentials 112 which is used to decrypt a portion of the AS_REP message. If the decryption is successful, the credentials 112 provided by the user 105 are known to be valid.

In response to successful validation, the application server 120 may generate a service ticket request 164 and receive a ticket reply 182 from the ticket granting service 180 running on the authentication server 130. In certain embodiments, the ticket reply 182 includes a service ticket 192 to be presented to a particular service provider 140. Specifically, the service ticket 192 may enable a user or group member to request services of the service provider 140. In response, to proper presentation of the service ticket 192, the service provider 140 and the application server 120 may securely exchange service data 194.

Figure 2:
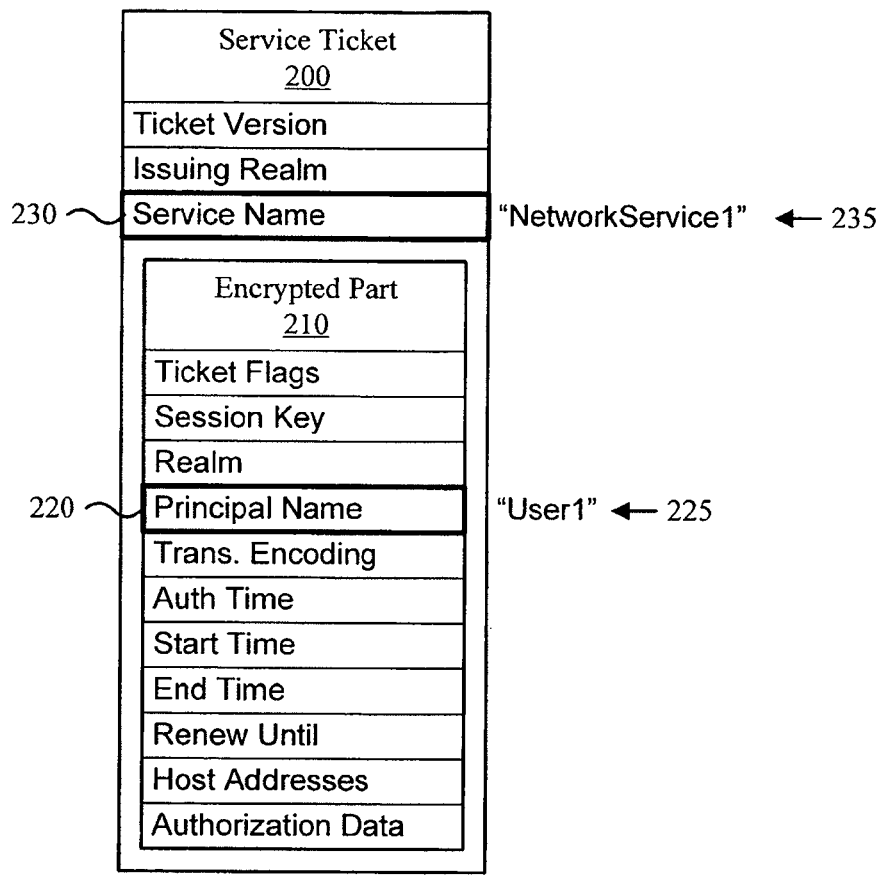
FIG. 2 is a block diagram illustrating a typical prior art service ticket.

FIG. 2 is a block diagram illustrating a typical prior art service ticket 200. The prior art service ticket 200 is one example of the service ticket 192 used in the prior art authentication system 100. The service ticket 200 ensures that user indicated by the 'principal name' field 220 and the service indicated by the 'service name' field 230 are authentic and may safely exchange service data. In the depicted embodiment, the service ticket 200 is a Kerberos service ticket, the 'principal name' field 220 references a user name 225 (i.e. "User1" in the depicted example) and the 'service name' field 230 references a service provider name 235 ("NetworkService1" in the depicted example).

Figure 3:
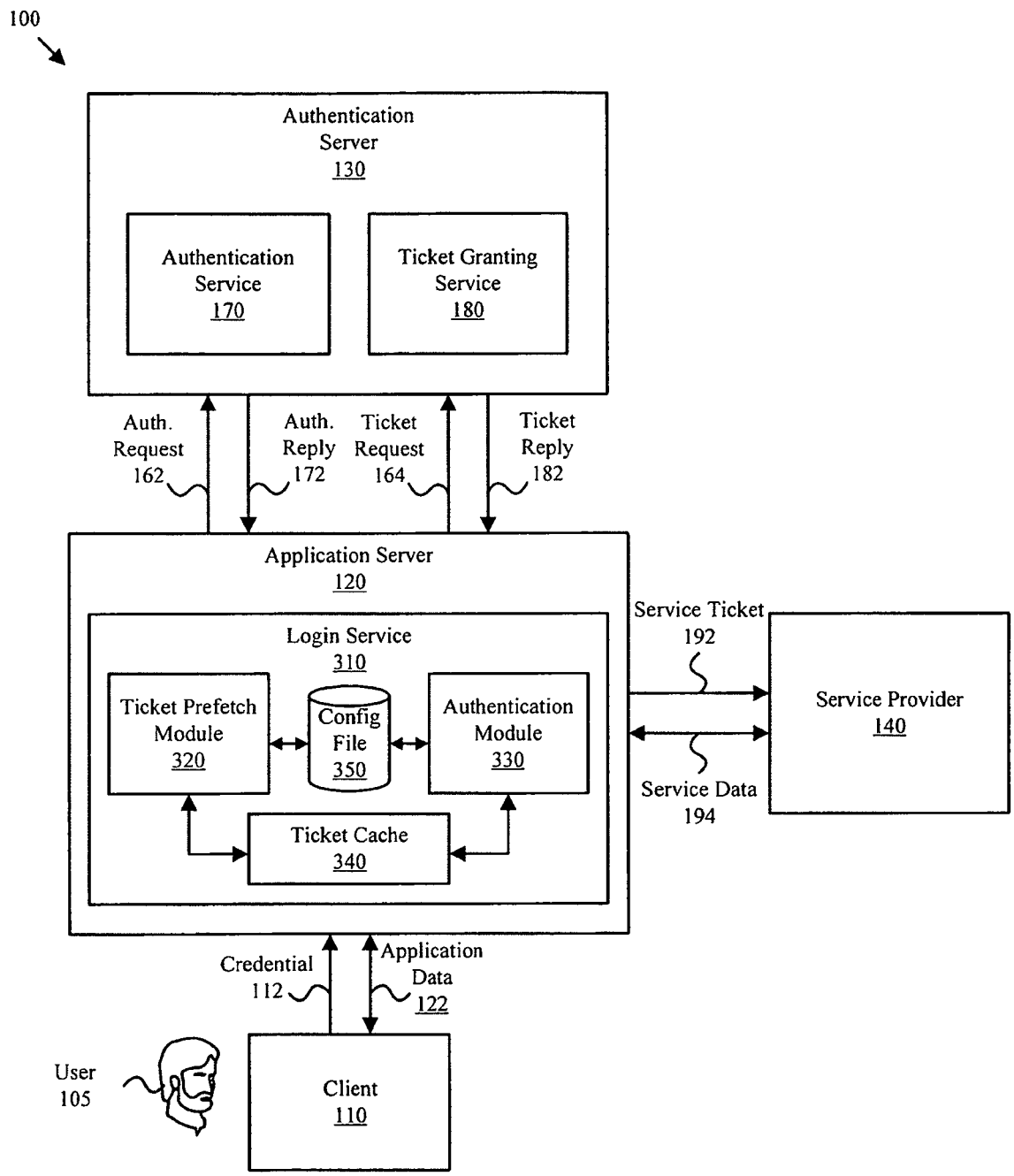
FIG. 3 is a block diagram illustrating a credential validation system of the present invention.

FIG. 3 is a block diagram illustrating a credential validation system 300 of the present invention. In addition to many of the elements of the prior art authentication system 100, the credential validation system 300 may include a login service 310. The depicted elements or similar elements function cooperatively to enable disconnected authentication of a user 105 without requiring a previous login by the user 105.

The depicted login service 310 includes a ticket pre-fetch module 320, an authentication module 330, a ticket cache 340, and a configuration file 350. Rather than obtaining service tickets for a user to communicate with a service provider as commonly done in the prior art, the ticket pre-fetch module 320 may pre-fetch one or more user service tickets (not shown) for a login device 110 or 120 to communicate with particular users or group members. In one embodiment, the ticket pre-fetch module 320 retrieves a pre-fetch list (not shown) from a known source such as the configuration file 350 and obtains user service tickets for the login device 120 to communicate with the users and group members referenced in the pre-fetch list.

It should be noted that the phrase "user service ticket" as used herein and subsequently shown in FIG. 5, refers to a service ticket for a login device to conduct communication with, or receive services from, a particular user. This contrasts with the prior art practice of obtaining service tickets for a user to communicate with a service provider or server.

The ticket pre-fetch module 320 may store the pre-fetched user service tickets (not shown) within the ticket cache 340. The pre-fetched user service tickets may also be refreshed within the ticket cache as need by obtaining a new user service tickets from the authentication service. In one embodiment, pre-fetched tickets are refreshed in response to selected events such as expiration of a selected interval, a login request, and a reboot cycle.

Figure 4:
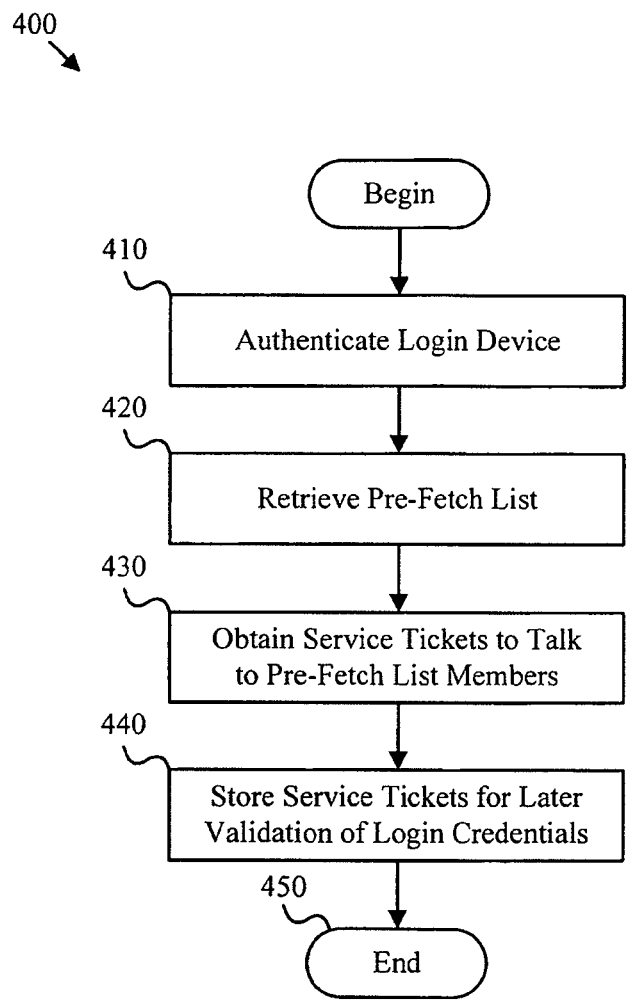
FIG. 4 is a flow chart diagram illustrating one embodiment of a ticket fetching method of the present invention.

In response to a login request, the authentication module 330 may access the ticket cache 340 and authenticate a user or group member against a pre-fetched user service ticket—particularly if the authentication server 130 is unavailable or inaccessible. FIGS. 4 thru 6 provide more detailed information regarding pre-fetching user service tickets issued to the login device to communicate with the user and the process of authenticating users against pre-fetched service tickets.

FIG. 4 is a flow chart diagram illustrating one embodiment of a ticket fetching method 400 of the present invention. As depicted, the ticket fetching method 400 include authenticating 410 a login device, retrieving 420 a pre-fetch list or the like, obtaining 430 one or more pre-fetched user service tickets, and storing 440 the pre-fetched user service tickets for subsequent validation of login credentials. The ticket fetching method 400 may be conducted in response to an event such as expiration of polling interval, execution of a reboot cycle, a login request, or similar event.

Authenticating 410 a login device may include sending an authentication request 162 (see FIG. 3) to request authentication of the login device 110 or 120 rather than the user 105. Subsequently, an authentication reply 172 may be used to authenticate the login credentials of the login device 110 or 120. Retrieving 420 a pre-fetch list or the like may include obtaining and/or referencing a list of users or group members for whom user service tickets should be pre-fetched. One of skill in the art will appreciate that the methods depicted herein need not be conducted in the depicted order. For example, retrieving 420 a pre-fetch list may occur previous to authenticating 410 a login device.

Obtaining 430 one or more pre-fetched user service tickets may include sending one or more ticket requests 164 for the login device 110 or 120 to communicate with each user or group member and receiving a ticket reply 182 for each user or group member with a user service ticket encapsulated therein. Storing 440 the pre-fetched user service tickets for subsequent validation login credentials may include storing the pre-fetched user service tickets in the ticket cache 340.

Figure 5:
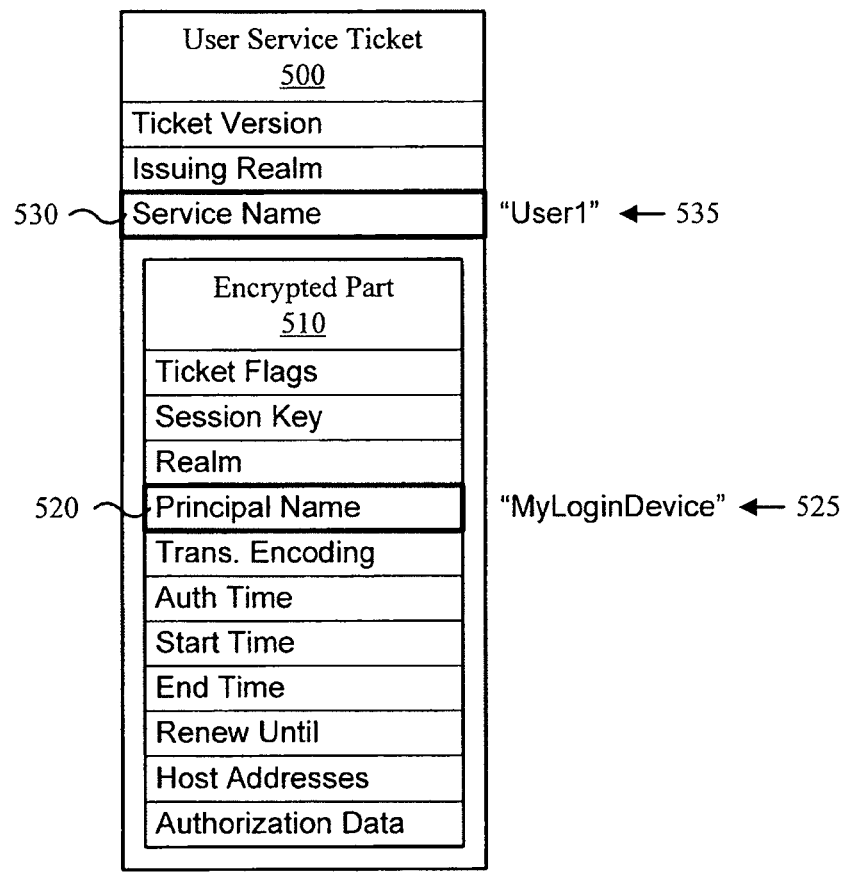
FIG. 5 is a block diagram illustrating a user service ticket of the present invention.
Figure 6:
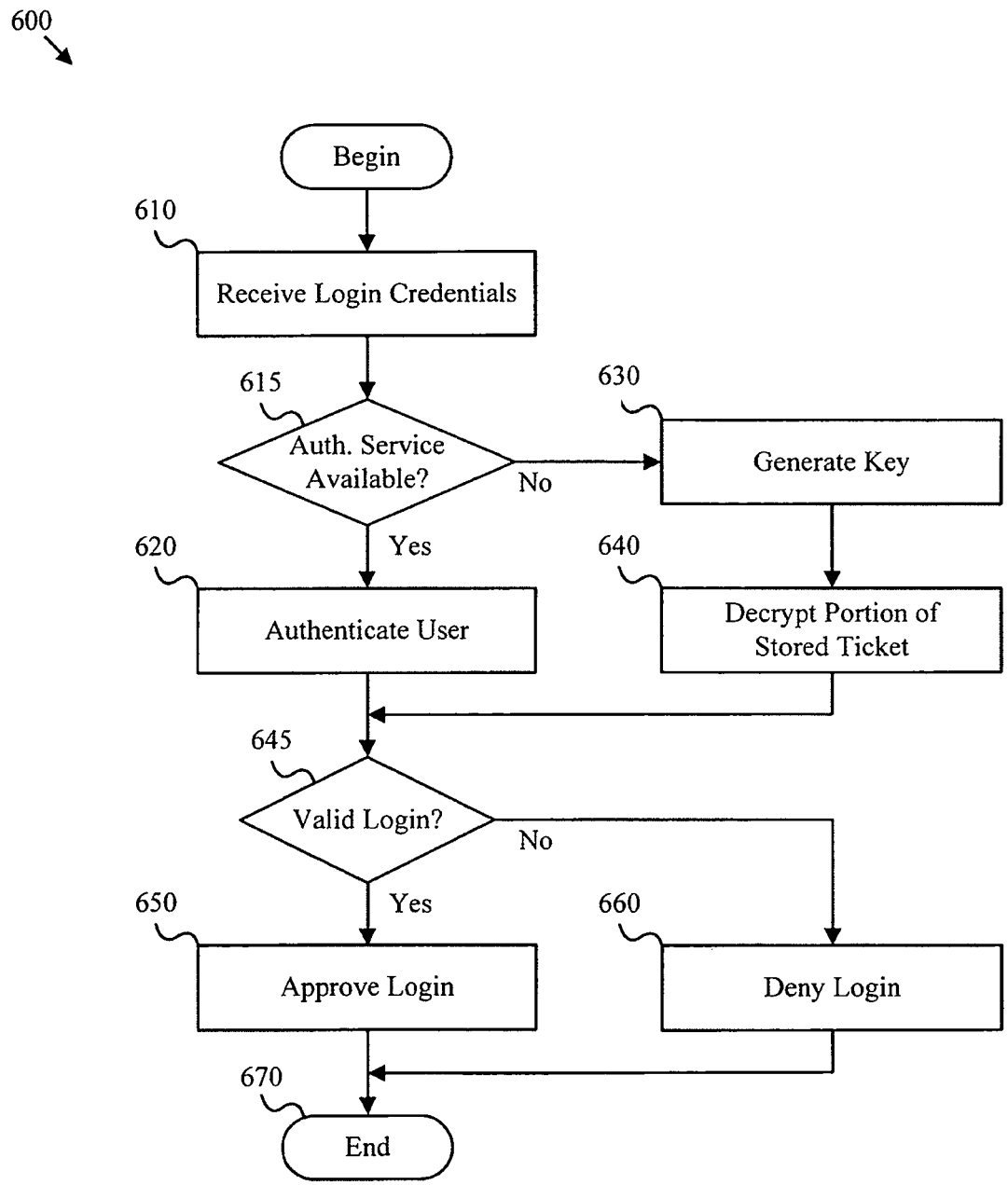
FIG. 6 is a flow chart diagram illustrating a credential validation method of the present invention.

FIG. 5 is a block diagram illustrating a user service ticket 500 of the present invention. Although the user service ticket 500 may be identical in format to the service ticket 200 depicted in FIG. 2, the fields may be used differently to facilitate disconnected authentication. Specifically, the 'principal name' field 520 may reference a login device name 525 rather than a user name, and the 'service name' field 530 may reference a user or group member name 535 rather than the name of a service provider. For example, the depicted user service ticket 500 enables the login device "MyLoginDevice" to request services of and communicate with the user "User1". The depicted user service ticket 500 may be pre-fetched before a need for authentication has arisen and stored in the ticket cache 340 to facilitate authentication of the login credentials for "User1".

Using the user service ticket in the described manner defers the need (for the login service 310 or the like) to know the login credentials of "User1" at the time the user service ticket 500 is issued. However, an encrypted part 510 of the user service ticket 500 may only be decrypted with a key derived from valid login credentials for "User1" thus facilitating authentication of the login credentials (by the login service 310 or the like) at a subsequent time such as in response to a login request.

FIG. 6 is a flow chart diagram illustrating a credential validation method 600 of the present invention. As depicted, the credential validation method 600 includes receiving 610 one or more login credentials, testing 615 if an authentication service is available, authenticating 620 the user if the authentication service is available, or generating 630 a key from the login credentials and decrypting 640 (a portion of) a pre-fetched user service ticket corresponding to the user if the authentication service is unavailable. The depicted method also includes testing 645 if the login credentials were valid and approving 650 or denying 660 the login attempt.

Receiving 610 one or more login credentials may include receiving a username and password from a user attempting to login on a device such as a computer or a mobile device. Testing 615 if an authentication service is available may include attempting to locate a particular authentication server associated with the login device or testing for a timeout condition on an authentication request. In one embodiment, the authentication server is a Kerberos authentication server and a Kerberos ticket granting server such as the server 130 shown in FIG. 1.

Authenticating 620 the user if the authentication service is available may include communicating with the authentication server in a manner previously described in the description of FIG. 1. For example, an authentication request 162 may be sent to the authentication server 130 and a key generated from the user name and password may be used to decrypt a portion of the authentication reply 172 and ascertain if the login credentials are valid.

If the authentication service is unavailable, the depicted method 600 may generate 630 a key from the user's login credentials and decrypt 640 (a portion of) a stored user service ticket using a key generated from the user's login credentials. Furthermore, authentication data within the pre-fetched user service ticket may be compared with known data to confirm the validity of the pre-fetched ticket. Consequently, a user or group member may be authenticated regardless of the immediate availability of an authentication server.

Subsequent to executing steps 620 or 640, the depicted method continues by testing 645 if the login credentials were valid and approving 650 or denying 660 the login attempt. Subsequently, the method ends 670.

The present invention facilitates disconnected authentication of users without requiring a previous login. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computerized method that processes login credentials, the method comprising:
pre-caching a Kerberos user service ticket in a ticket cache associated with a login device, the Kerberos user service ticket comprising an encrypted portion with identification information about a user that is used to subsequently authenticate the user, wherein the Kerberos user service ticket identifies the login device as a principal and a user as a service provider;
receiving an authentication request at the login device from the user subsequent to pre-caching the Kerberos user service ticket, the authentication request comprising one or more login credentials of the user;
in response to receiving the authentication request from the user, determining whether a Kerberos server is unavailable; and
in response to determining that the Kerberos server is unavailable, authenticating the user based on the Kerberos user service ticket stored in the ticket cache, said authenticating comprising decrypting the Kerberos user service ticket and comparing the identification information about the user stored in the Kerberos user service ticket with the one or more login credentials of the user.

2. The computerized method of claim 1, wherein authenticating the user with the Kerberos user service ticket comprises using the Kerberos user service ticket to construct a Kerberos AP-REQ message structure that is validated using a credential generated key for the user.

3. The computerized method of claim 1, wherein the Kerberos user service ticket stores an identifier of the login device in the encrypted portion of the Kerberos user service ticket.

4. The computerized method of claim 1, wherein the Kerberos server is a Kerberos key distribution center (KDC).

5. The computerized method of claim 1, wherein the method further comprises refreshing the Kerberos user service ticket.

6. The computerized method of claim 5, wherein the Kerberos user service ticket is refreshed in response to an event selected from a group consisting of expiration of a selected interval, a login request, a change in user credentials, and during a reboot cycle.

7. The computerized method of claim 1, wherein the Kerberos user service ticket comprises an identifier of the login device in a username field and an identifier of the user in a service name field.

8. An apparatus to validate login credentials, the apparatus comprising:
a computer processor;
a ticket pre-fetch module comprising computer-executable instructions that cause the processor to obtain a Kerberos user service ticket from a Kerberos server, wherein the Kerberos user service ticket identifies a login device as a principal and a user as a service provider and comprises an encrypted portion with identification information about the user that is used to subsequently authenticate the user;
a ticket cache configured to pre-cache the Kerberos user service ticket for subsequent authentication of the user; and
an authentication module comprising computer-executable instructions that cause the processor to:
receive an authentication request at the login device for the user subsequent to pre-caching of the Kerberos user service ticket in the ticket cache, the authentication request comprising one or more login credentials of the user,
determine whether the Kerberos server is available, and
in response to determining that the Kerberos server is unavailable, authenticate the user with the Kerberos user service ticket by at least decrypting the Kerberos user service ticket and comparing the identification information about the user stored in the Kerberos user service ticket with one or more login credentials of the user.

9. The apparatus of claim 8, wherein the authentication module further causes the processor to generate a key for the user from the one or more login credentials, decrypt a portion of the Kerberos user service ticket using the key for the user, and validate authentication data associated with the Kerberos user service ticket.

10. The apparatus of claim 8, wherein the authentication module further causes the processor to use the Kerberos user service ticket to construct a Kerberos AP-REQ message structure that is validated using a key for the user.

11. The apparatus of claim 8, wherein the ticket pre-fetch module further causes the processor to refresh the Kerberos user service ticket.

12. The apparatus of claim 11, wherein the ticket pre-fetch module further causes the processor to refresh the Kerberos user service ticket in response to an event selected from a group consisting of expiration of a selected interval, a change in user credentials, a login request, and a reboot cycle.

13. The apparatus of claim 8, wherein the Kerberos user service ticket comprises an identifier of the login device in a username field and an identifier of the user in a service name field.

14. A tangible computer storage device having encoded thereon a plurality of computer-executable instructions that, when combined with computer hardware capable of executing the instructions, create computer circuitry that performs operations defined by the computer-executable instructions, the computer-executable instructions comprising:
 a first set of computer-executable instructions that causes the computer hardware to receive a first service ticket for a login device from an authentication server prior to receiving a login request of a user, wherein the first service ticket identifies the login device as a principal and the user as a service provider and the first service ticket further comprises an encrypted portion with identification information about the user that is used to subsequently authenticate the user;
 a second set of computer-executable instructions that causes the computer hardware to pre-cache the first service ticket in a ticket cache;
 a third set of computer-executable instructions that causes the computer hardware to receive a login request with the login device from the user to access a service subsequent to said pre-caching of the first service ticket, the login request from the user comprising a login credential;
 a fourth set of computer-executable instructions that causes the computer hardware to attempt to obtain a second service ticket from the authentication server in response to receiving the login request from the user; and
 a fifth set of computer-executable instructions that causes the computer hardware, in response to failing to receive the second service ticket, to authenticate the user by comparing information in the first service ticket stored in the ticket cache with the login credential.

15. The tangible computer storage device of claim 14, wherein said fourth set of computer-executable instructions that causes the computer hardware to attempt to obtain the second service ticket from the authentication server comprises instructions that cause the computer hardware to test for a timeout condition.

16. The tangible computer storage device of claim 14, wherein said fifth set of computer-executable instructions that causes the computer hardware to authenticate the user by comparing information in the first service ticket stored in the ticket cache with the login credential comprises instructions that cause the computer hardware to authenticate the user by comparing information in the first service ticket stored in the ticket cache with the login credential in response to a timeout condition being satisfied.

17. The tangible computer storage device of claim 14, wherein said first set of computer-executable instructions that causes the computer hardware to receive the first service ticket for the login device comprises instructions that cause the computer hardware to authenticate the login device used by the user.

18. The tangible computer storage device of claim 14, wherein the first service ticket comprises an identifier of the login device in a username field and an identifier of the user in a service name field.

19. The tangible computer storage device of claim 14, wherein said fifth set of computer-executable instructions that causes the computer hardware to authenticate the user by comparing the first service ticket and the login credential comprises instructions that cause the computer hardware to decrypt at least a portion of the first service ticket using a key generated from the login credential.

* * * * *